(12) United States Patent
Yang et al.

(10) Patent No.: US 12,536,344 B2
(45) Date of Patent: Jan. 27, 2026

(54) AI-BASED METHOD FOR GENERATING BUILDING BLOCK IN COMMERCIAL DISTRICT

(71) Applicant: SOUTHEAST UNIVERSITY, Jiangsu (CN)

(72) Inventors: Junyan Yang, Jiangsu (CN); Daijun Chen, Jiangsu (CN); Yi Shi, Jiangsu (CN); Xiao Zhu, Jiangsu (CN); Huaxing Sheng, Jiangsu (CN); Beixiang Shi, Jiangsu (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 1100 days.

(21) Appl. No.: 17/614,291

(22) PCT Filed: Oct. 28, 2020

(86) PCT No.: PCT/CN2020/124323
§ 371 (c)(1),
(2) Date: Nov. 24, 2021

(87) PCT Pub. No.: WO2022/047960
PCT Pub. Date: Mar. 10, 2022

(65) Prior Publication Data
US 2022/0318443 A1 Oct. 6, 2022

(30) Foreign Application Priority Data
Sep. 4, 2020 (CN) .......................... 202010923491.2

(51) Int. Cl.
*G06F 30/13* (2020.01)
*G06F 30/27* (2020.01)
*G06N 3/045* (2023.01)

(52) U.S. Cl.
CPC .............. *G06F 30/13* (2020.01); *G06F 30/27* (2020.01); *G06N 3/045* (2023.01)

(58) Field of Classification Search
CPC .......... G06F 30/00; G06F 30/13; G06F 30/27; G06F 18/214; G06N 3/047; G06N 3/088;
(Continued)

(56) References Cited

U.S. PATENT DOCUMENTS

| 2019/0228115 A1 | 7/2019 | Bergin | |
| 2022/0114293 A1* | 4/2022 | Bianchi | ................... G06F 30/20 |
| 2022/0309202 A1* | 9/2022 | Yang | .................. G01C 21/3852 |

FOREIGN PATENT DOCUMENTS

| CN | 104732591 A | * | 6/2015 | |
| CN | 108265820 A | * | 7/2018 | ............. E01C 1/002 |

(Continued)

*Primary Examiner* — Cedric Johnson
(74) *Attorney, Agent, or Firm* — MUNCY, GEISSLER, OLDS & LOWE, P.C.

(57) ABSTRACT

In an artificial intelligence (AI)-based method for generating a building block in a commercial district, geographic information data of a target district and surrounding districts is acquired to construct a three-dimensional space sand table, then design conditions in various planning files and local legal regulations are translated and extracted to generate a three-dimensional building block of the district, and then a training sample library of three-dimensional contour lines of the district is constructed, a machine learning model is loaded to generate three-dimensional building heights of the district and optimize building forms, to generate a plurality of schemes for the building block of the district, and finally simulated display of the schemes and display of scheme indexes are performed by using a holographic display device, and the schemes are outputted.

10 Claims, 9 Drawing Sheets

(58) Field of Classification Search
CPC ...... G06N 20/00; G06N 3/045; G06N 3/0464; G06N 3/0475; G06N 3/09; G06N 3/094; G06T 17/00; G06V 10/44
USPC .......................................................... 703/1
See application file for complete search history.

(56) References Cited

FOREIGN PATENT DOCUMENTS

| CN | 109635511 A |   | 4/2019 |             |
|----|-------------|---|--------|-------------|
| CN | 111383303 A | * | 7/2020 | G06T 11/60  |
| CN | 112270027 B | * | 7/2021 | G06Q 50/26  |

* cited by examiner

AI-BASED METHOD FOR GENERATING BUILDING BLOCK IN COMMERCIAL DISTRICT

TECHNICAL FIELD

The present invention relates to the field of artificial intelligence (AI) urban design, and in particular, to an AI-based method for generating a building block in a commercial district.

BACKGROUND

In the process of urban design, it is necessary to excavate various possibilities of a three-dimensional space form of a district under an established development index. The distribution setting and adjustment of a total amount of development among a plurality of districts are required, and the various possibilities of a three-dimensional building group form corresponding to the development indexes of each district also need to be excavated, thereby achieving the form control of a city in which the districts are located. In the previous design process, the generation from developing indexes to the three-dimensional form of the building was completed manually by planning personnel. When the various possibilities of the scheme need to be excavated, a lot of people and time are required to complete this work.

With the gradual application of the AI technology to the field of urban design, the automatic generation from the development indexes to the three-dimensional building group form is achieved. However, due to the uncontrollability of the conventional intelligent generation method, an excessively large quantity of invalid schemes are often generated, which cannot meet the actual requirements of the current urban design.

SUMMARY

In order to resolve the deficiencies mentioned in the above background art, the present invention is intended to provide an AI-based method for generating a building block in a commercial district. The method provides an automated and intelligent design method and system for the space design of a commercial district, thereby implementing the generation of a plurality of valid schemes and the parameter adjustment after space generation, and effectively improving design efficiency of a planner.

The objective of the present invention may be achieved by the following technical solutions:

An AI-based method for generating a building block in a commercial district includes the following steps:

S1: collection of basic data of a district and construction of a three-dimensional space sand table, including:
acquiring geographic information data of a target district and surrounding districts, converting the data to be in a same coordinate system, and constructing a three-dimensional space sand table;

S2: extraction of district design conditions and spatial matching, including:
translating and extracting design conditions in various planning files and local legal regulations, performing spatial information matching, and embedding the design conditions in the target district in a form of an attribute table;

S3: generation of a three-dimensional building block of the district based on the design conditions, including:
successively generating a two-dimensional plane of the district, a three-dimensional space block of the district, a public space of the district, entrances and exits of the district for pedestrians, a tower building of the district, and a podium building of the district based on the extracted design conditions;

S4: generation of three-dimensional building heights of the district and optimization of building forms based on machine learning, including:
constructing a training sample library of three-dimensional contour lines of the district, loading a machine learning model to generate three-dimensional building heights of the district, and optimizing building forms, to generate a plurality of schemes for the building block of the district; and S5: human-computer interactive display of the schemes and output of the schemes, including:
performing simulated display of the schemes and display of scheme indexes by using a holographic display device, and outputting the schemes.

Further, step S1 includes the following steps:

S11: collection of data about geographic information of the district, including:
collecting, by using a surveying and mapping unmanned aerial vehicle (UAV) having more than 20 million pixels, geospatial information of a target district and a district expanding from the target district, converting, by using a built-in data collection module, image information in a grid format to vector data, and inputting the vector data to a geographic information platform; and S12: construction of a three-dimensional space sand table of the district, including:
in the geographic information platform, converting the geospatial vector data in step S11 to be in a same coordinate system, performing matching between spatial geographic coordinates and projection coordinates, and constructing a high-precision three-dimensional space sand table.

Further, the geospatial information includes a district road, a district building, a district public space, and a district terrain.

Further, step S2 includes the following steps:

S21: extraction of the design conditions of the district, including:
collecting a regulatory planning text and a relevant legal regulation file related to the target district by using a built-in data collection interface, loading a database component to extract the design conditions of the district, and presetting to-be-extracted content of the design conditions of the district in the component, where the to-be-extracted content includes: a floor area ratio, a building density, a building height restriction, a building setback line, a fire protection spacing of a commercial building, a spacing between an entrance and an exit for pedestrians, and a stopping sight distance of surrounding roads; and S22: standardized processing of the design conditions and spatial matching of the district, including:
standardizing the design conditions of the district collected in S21, adjusting data formats to be same, performing spatial matching with the three-dimensional space sand table, and providing a link to the target district in a form of an attribute table.

Further, the building setback line includes a podium building setback line and a high-rise building setback line.

Further, the relevant legal regulations include the Code for Design of Store buildings, the Code for Fire Protection Design of Buildings, and the Code for Planning of Intersections on Urban Roads.

Further, step S3 includes the following steps:

S31: generation of the two-dimensional plane of the district, including:

recognizing the building setback line index of a podium building and the stopping sight distance index of surrounding roads in the design conditions of the district in step S22, shrinking contour lines of the district inward by a corresponding distance to form a planar contour line of the district, and filling the planar contour line of the district, to form a two-dimensional plane of the district;

S32: generation of the three-dimensional space block of the district, including:

recognizing the building height restriction index in the design conditions of the district in step S22, and lifting the two-dimensional plane of the district in step S31 to the building height restriction, to form a three-dimensional space block of the district;

S33: generation of the public space of the district, including:

determining a length and a width of a horizontal contour line of the three-dimensional space block in step S32 by using a commercial building column grid modulus as a building level reference modulus unit, and if a long side of the horizontal contour line of the district is less than or equal to two building horizontal reference modulus units, skipping generating the public space; if a short side of the horizontal contour line of the district is greater than two building level reference modulus units, shrinking the horizontal contour line of the district inward by two building level reference modulus units, to form a horizontal contour line of the public space;

if a short side of the horizontal contour line of the public space is greater than 1.5 meters, removing a part formed by the horizontal contour line of the public space from the three-dimensional space block of the district, to form the public space of the district; and if the short side of the horizontal contour line of the public space is less than 1.5 meters, skipping generating the public space;

S34: generation of the entrances and the exits of the district for pedestrians, including: recognizing an entrance-exit spacing index in step 22, setting an entrance and an exit having a width of 4 meters for pedestrians at an interval of the spacing index, to form a horizontal contour line of the entrances and the exits, and generating a three-dimensional space block of the public space in step 33 to cut the contour line of the entrances and the exits, to form the entrances and the exits for pedestrians and building blocks having a same height;

S35: generation of the tower building and the podium building of the district, including:

determining a height of the three-dimensional space block generated in step S32, and according to a requirement for a minimum quantity of storeys of the tower and an average height of each storey of the tower, if the height is less than 48 meters, skipping generating the tower building, where the tower buildings are all multi-storey podium buildings; if the height is greater than or equal to 48 meters, expanding the three-dimensional space block toward two sides by 30-40 meters from a vertex of the planar contour line of the district in step 31, to form a planar contour line of the towers, recognizing the high-rise building setback line index in step 22, and shrinking the planar contour line of the towers inward by a corresponding distance;

determining a quantity of to-be-generated towers, and according to a minimum fire protection spacing and a tower width, if the long side of the horizontal contour line of the district is less than 53 meters, generating 1 tower; if the long side of the horizontal contour line of the district is greater than 73 meters and the short side is less than 53 meters, generating 2 towers; and if both the sides of the contour line of the district are greater than 73 meters, generating 4 towers, and screening planar contour lines of the generated towers to remove planar contour lines of towers having two sides that do not face roads.

Further, step S4 includes the following steps:

S41: construction of the training sample library of the three-dimensional contour lines of the district, including:

collecting remote-sensing images of districts and images of street view of different cities by using a built-in data collection module, adjusting the remote-sensing images and the images of the street view to a same proportional scale of 1:2000 and a same dimension of 1920*1080, to form a sample library of the districts and generate form characteristic indexes of the districts, inputting a form characteristic index of the target district, and selecting districts having a matching degree of more than 90% and extracting three-dimensional contour lines of the districts to form the training sample library for the three-dimensional contour lines of the district, where a quantity of training samples is 10000;

S42: generation of the building heights and optimization of the building forms of the district, including:

constructing a convolutional neural network (CNN) model by using the training sample library for the three-dimensional contour lines of the district generated in step S41, to recognize concave-convex characteristics of the three-dimensional contour lines of the district in the training sample library, to generate the three-dimensional contour lines of the target district, constructing a generative adversarial network (GAN) model to perform adversarial training on the generated three-dimensional contour lines of the target district, so that a generated sample gradually approximates the training sample, and outputting a three-dimensional contour line scheme set of the district, to generate the building heights of the district and optimize the forms of the podium buildings in step S35;

S43: generation of the schemes for the building block of the district, including:

recognizing a floor area ratio index of the district in step 22, performing interactive verification with the schemes for the building block of different heights generated in step S36, and performing height adjustment on a scheme that does not meet the floor area ratio requirement, until the floor area ratio requirement is met, where a calculation formula of the floor area ratio R is:

$$R = \frac{H_{tower}/4 * S_{tower} + H_{podium}/5 * S_{podium}}{S_{district}}$$

where $H_{tower}$ is a height of a tower building, $H_{tower}$ is a floor area of the tower building, $H_{podium}$ is a height of the podium building, $H_{podium}$ is a floor area of the podium building, and $S_{district}$ is an area of the district.

Further, the form characteristic indexes of the district include a shape index of the district, an area of the district, a building density, a floor area ratio, and a land use property, the concave-convex characteristics of the three-dimensional contour line of the district include a location of a protruding point of a vertical surface, a convex-concave degree of the vertical surface, and a convex-concave degree of a horizontal surface, the location of the protruding point of the vertical surface may be used for determining a tower location, the convex-concave degree of the vertical surface may be used for determining the building height, and the convex-concave degree of the horizontal surface may be used for optimizing the building form of the podium.

Further, step S5 includes the following steps:

S51: visualization of the design schemes for a three-dimensional building block of the district, including: embedding the plurality of schemes for the building block of the district generated in step S43 in the three-dimensional space sand table, and performing simulated display of the schemes and display of the scheme indexes by using a 360° holographic display device; and S52: outputting of the scheme results, including: printing the schemes for the building block of the district in step S43 by using a color printer having a resolution of not less than 4800 dpi to obtain a paper drawing, and exporting the paper drawing to auxiliary design software such as SketchUp and AutoCAD by using a built-in file format conversion module for further design and optimization by planning staff.

Beneficial effects of the present invention are as follows:

1. Process efficiency: According to the method designed in the present invention, a plurality of schemes can be generated simultaneously within a short period by setting design conditions of the schemes for the building block in a commercial district. The schemes may be completed for the design time of at least two weeks in the past reduced to one day. In addition, only one designer is required to complete the generation of the plurality of schemes instead of at least ten designers for the generation and comparison and selection of the plurality of schemes. Moreover, at least one hundred valid schemes can be generated instead of a maximum of twenty valid schemes, effectively reducing labor costs and improving the design efficiency.

2. Scheme validity: According to the method designed in the present invention, characteristics of schemes for a mature building block in a commercial district is learned, recognized, and extracted by applying a GAN. On this basis, the schemes for the building block in the commercial district are automatically generated, so as to ensure validity of the scheme generation, avoiding the uncontrollability of generation of previous AI urban design schemes. In case of an inefficient and time-consuming process of screening out an effective scheme from tens of millions of schemes, the plurality of valid schemes are directly compared and selected, promoting the reliability and efficiency of the comparison and selection of the scheme.

BRIEF DESCRIPTION OF THE DRAWINGS

The following further describes the present invention in detail with reference to the accompanying drawings.

DETAILED DESCRIPTION

The technical solutions of the embodiments of the present invention are clearly and completely described below with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

The present invention describes the technical solution of the present invention in detail in combination with a generation case of a building block of a district and the accompanying drawings of a certain core business plot in Sichuan Province.

Figure 1:
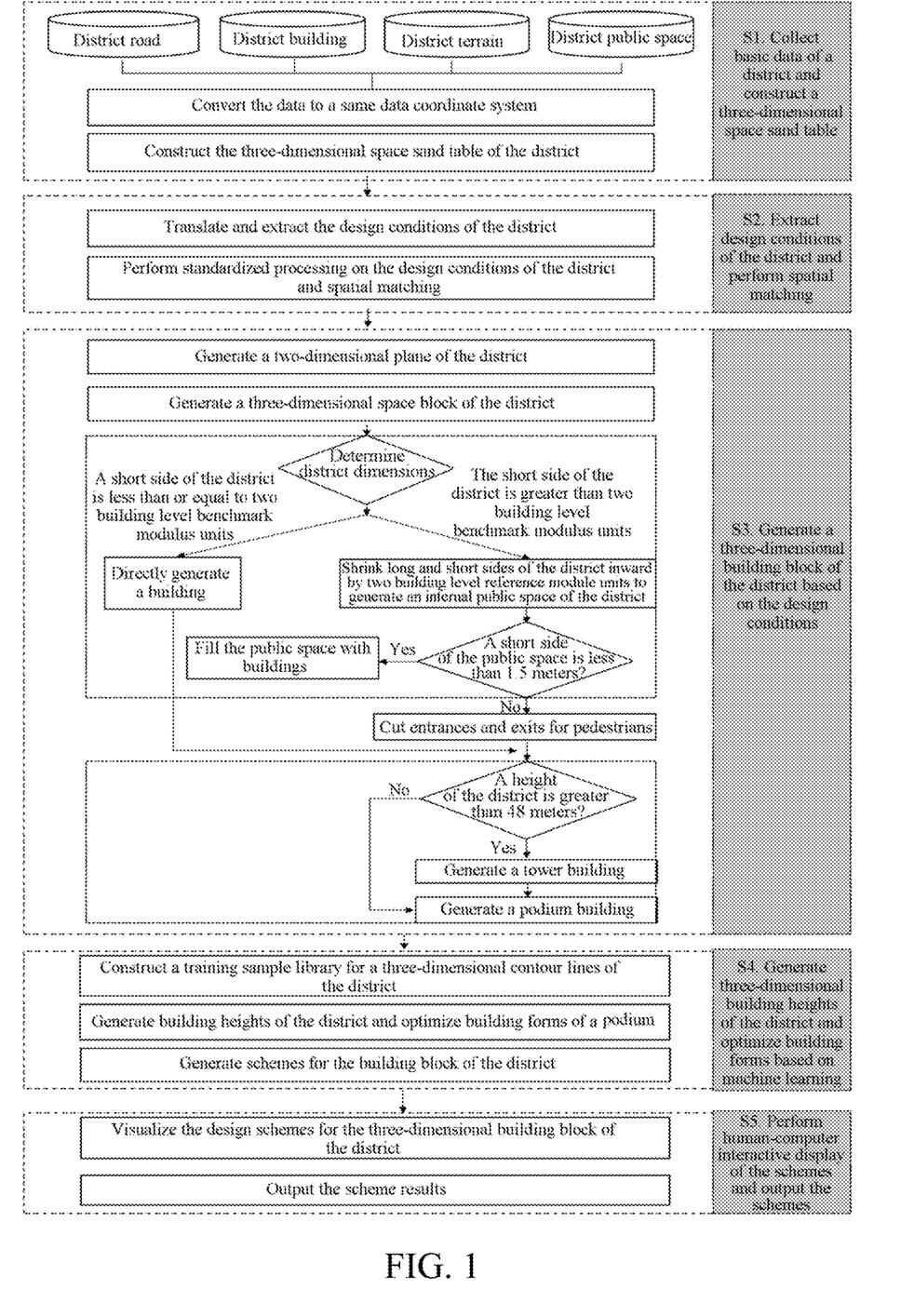
FIG. 1 is a schematic flowchart of a method for generating a building block in a commercial district according to the present invention.

As shown in FIG. 1, an AI-based method for generating a building block in a commercial district includes the following steps.

S1: Collect basic data of a district and construct a three-dimensional space sand table.

Geographic information data of a target district and surrounding districts is acquired, the data is converted to be in a same coordinate system, and a three-dimensional space sand table is constructed.

S11: Collect data about geographic information of the district.

Figure 2:
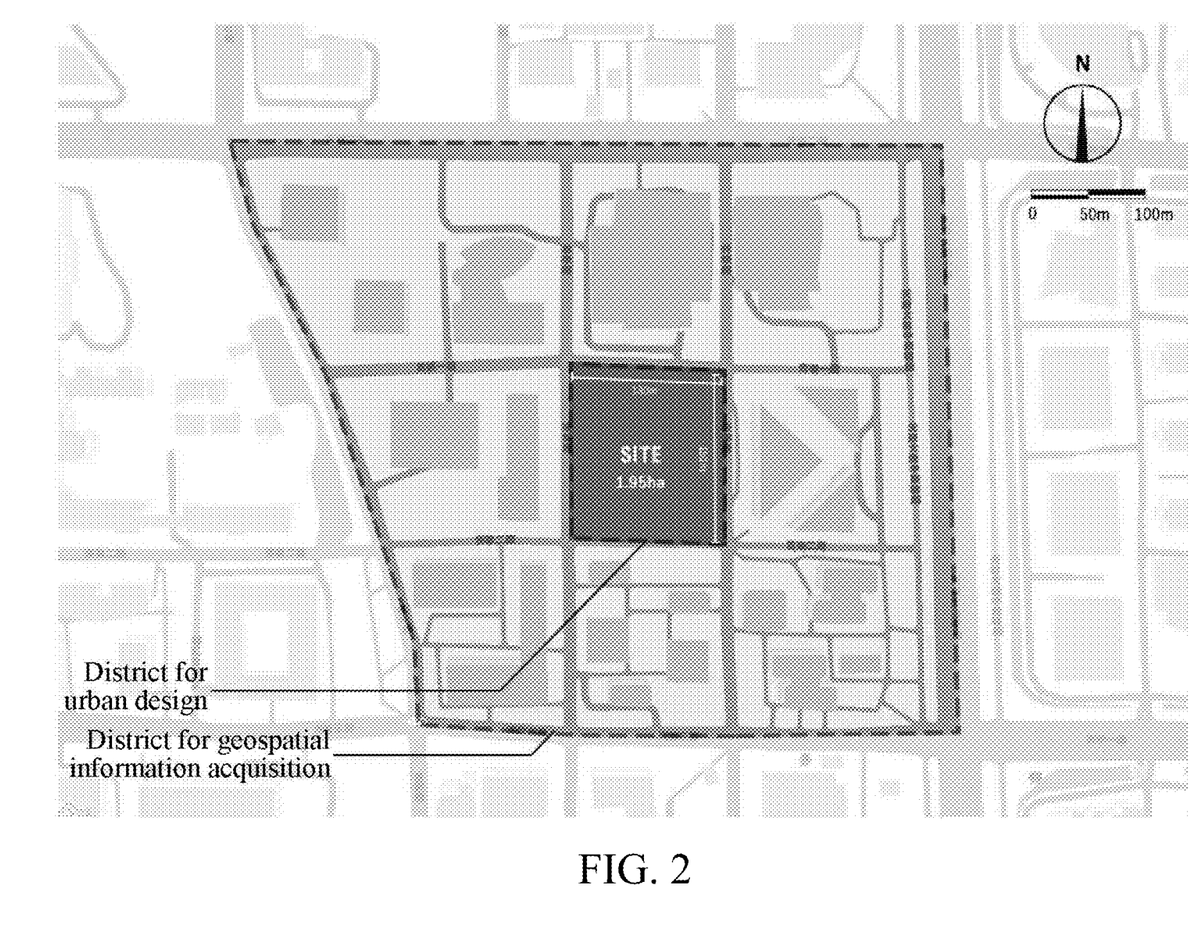
FIG. 2 is a schematic diagram of a planning range of a scheme for a building block in a commercial district according to the present invention.

Geospatial information of related blocks (including a target district and a district expanding from the target district) is collected by using a surveying and mapping UAV having more than 20 million pixels. As shown in FIG. 2, image information in a grid format is converted to vector data by using a built-in data collection module, and the vector data is inputted to the geographic information platform. The geospatial information includes a district road, a district building, a district public space, and a district terrain.

In this embodiment, a surveying and mapping UAV having more than 20 million pixels is used, and the core business plot and an area of a district expanding outward (as shown in FIG. 2) are set as a flying surveying and mapping area of the surveying and mapping UAV. The surveying and mapping UAV are operated to fly in a flight surveying and mapping area, and geospatial information of a relevant plot for regulatory adjustment is collected. The geospatial information includes information about a district road, a district building, a district public space, and a district terrain. The collected data of the district is imported into a computer after the surveying and mapping UAV is recovered. For the imported data, a Streamline vectorization system is used to convert the picture information in a grid format to vector data, and input the vector data to a geographic information platform built by a computer server.

S12: Construct a three-dimensional space sand table of the district.

In the geographic information platform, the geospatial vector data in step S11 is converted to be in a same coordinate system, matching between spatial geographic coordinates and projection coordinates is performed, and a high-precision three-dimensional space sand table is constructed.

In this embodiment, the vector data obtained in S11 is transferred to a same coordinate system by using a spatial adjustment tool, and matching between spatial geographic coordinates and projection coordinates is performed.

S2: Extract district design conditions and perform spatial matching.

Design conditions in various planning files and local legal regulations are translated and extracted, and spatial information matching is performed, and the design conditions are embedded in the target district in a form of an attribute table.

S21: Extract the design conditions of the district.

A regulatory planning text and a relevant legal regulation file related to a target district are collected by using a built-in data collection interface, a database component is loaded to extract the design conditions of the district, and to-be-extracted content of the design conditions of the district is preset in the component. The to-be-extracted content includes: a floor area ratio, a building density, a building height restriction, a building setback line (a setback line of a podium and a setback line of a high-rise building), a fire protection spacing of a commercial building, a spacing between an entrance and an exit for pedestrians, and a stopping sight distance of surrounding roads. The relevant legal specification includes the Code for Design of Store buildings, the Code for Fire Protection Design of Buildings, and the Code for Planning of Intersections on Urban Roads.

In this embodiment, the Regulatory Plan of a Commercial Plot in Sichuan, the Code for Design of Store Buildings, the Code for Fire Protection Design of Buildings, and the Code for Planning of Intersections on Urban Roads are imported into the computer. A floor area ratio, a building density, a building height restriction, a building setback line (a setback line of a podium and a setback line of a high-rise building), a fire protection spacing of a commercial building, a spacing between an entrance and an exit for pedestrians, and a stopping sight distance of surrounding roads of the 07-43 plot are extracted by using a content recognition tool, and the extracted content is imported into the geographic information platform. The floor area ratio of the 07-43 plot is 5.2, the building density is 35%, the building height restriction is 150 meters, the building setback line of the high-rise building is 15 meters, the building setback line of the podium is 10 meters, the fire protection spacing of the high-rise commercial building is 13 meters, an entrance-exit spacing is 80 meters, and the stopping sight distance of the surrounding roads is 40 meters.

S22: Perform standardized processing of the design conditions and spatial matching of the district.

The design conditions of the district collected in S21 are standardized, data formats are adjusted to be same, spatial matching is performed with the three-dimensional space sand table, and a link to the target district in a form of an attribute table is provided.

In this embodiment, the district design condition collected in S21 is standardized, a data format is unified, spatial matching is performed with a three-dimensional space sand table, and a link to the target district is provided in a form of an attribute table. The attribute table information includes a standardized floor area ratio, a building density, a building height restriction, a building setback line (a setback line of a podium and a setback line of a high-rise building), a fire protection spacing of a commercial building, a spacing between an entrance and an exit for pedestrians, and a stopping sight distance of surrounding roads.

Figure 3:
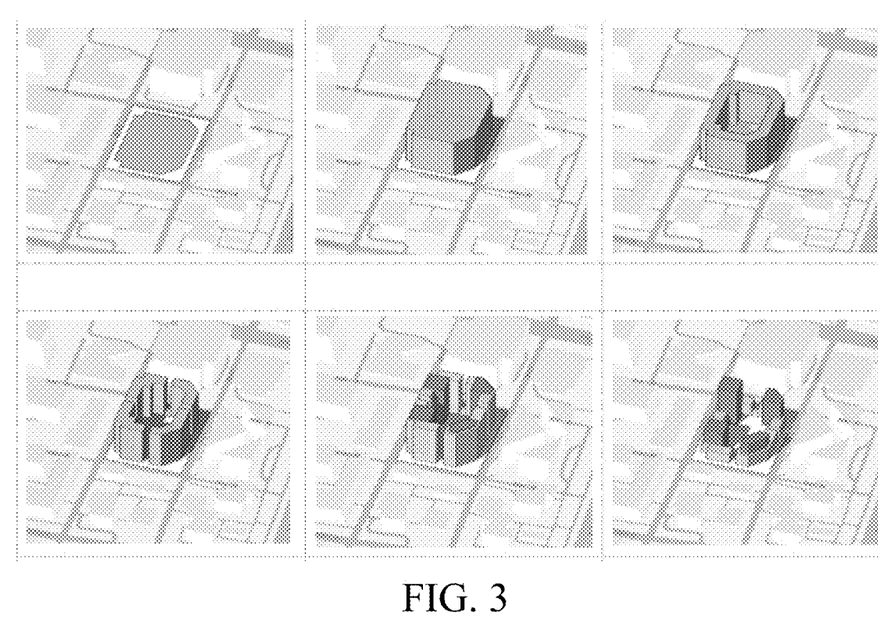
FIG. 3 is a schematic diagram showing generation of a scheme for a building block in a commercial district according to the present invention.

S3: Generate a three-dimensional building block of the district based on the design conditions.

A two-dimensional plane of the district, a three-dimensional space block of the district, a public space of the district, entrances and exits of the district for pedestrians, and a tower building and a podium building of the district are successively generated based on the extracted design conditions.

Figure 4:
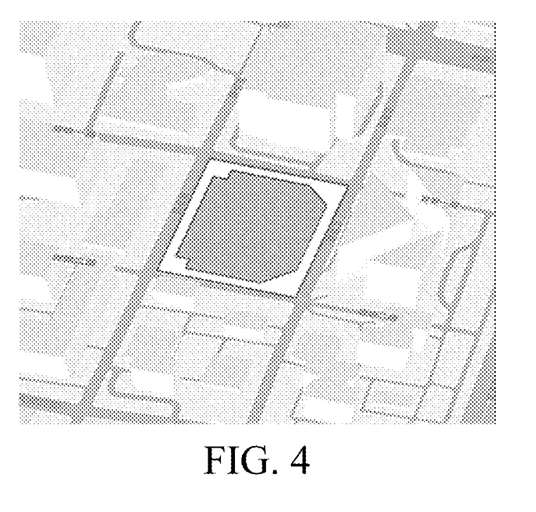
FIG. 4 is a schematic diagram showing generation of a two-dimensional plane of a district of a building block in a commercial district according to the present invention.

S31: Generate the two-dimensional plane of the district.

A setback line index of a building and a stopping sight distance index in the district design condition in step S22 are recognized, contour lines of the district are shrunk inward by a corresponding distance to form a planar contour line of the district, and a two-dimensional plane of the district is formed by filling the planar contour line of the district.

In this embodiment, the setback line of the podium building of 10 meters and the stopping sight distance index of 40 meters are extracted in an attribute table of step S22, the contour lines of the district are shrunk inward by 10 meters, and a street corner is shrunk inward for the sight distance by a triangle according to the stopping sight distance, to form a planar contour line of the district. The two-dimensional plane of the district is formed by filling the planar contour line of the district by using a line-face tool.

Figure 5:
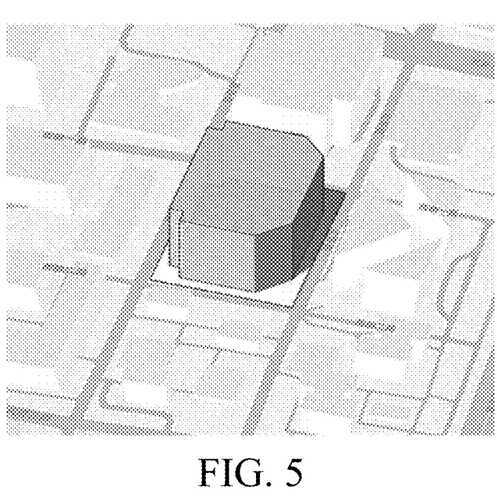
FIG. 5 is a schematic diagram showing generation of a three-dimensional space block of a district of a building block in a commercial district according to the present invention.

S32: Generate the three-dimensional space block of the district.

A building height restriction index in the district design condition in step S22 is recognized, and the two-dimensional plane of the district in step S31 is lifted to the building height restriction, to form a three-dimensional space block of the district.

In this embodiment, a building height restriction in the district design condition in step S22 is recognized as 150 meters, and the two-dimensional plane of the district in step S31 is lifted to the height of 150 meters, to form a three-dimensional space block of the district.

Figure 6:
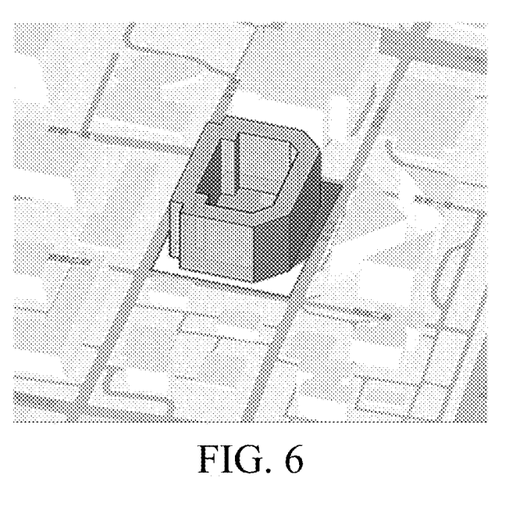
FIG. 6 is a schematic diagram showing generation of a public space of a district of a building block in a commercial district according to the present invention.

S33: Generate the public space of the district.

A commercial building column grid modulus (8.4 meters) is used as a building level reference modulus unit. A length and a width of a horizontal contour line of the three-dimensional space block of the district in step S32 are determined according to the building level reference modulus unit. If a long side of the horizontal contour line of the district is less than or equal to two building horizontal reference modulus units (16.8 meters), the public space is not to be generated.

If a short side of the horizontal contour line of the district is greater than two building level reference modulus units (16.8 meters), the horizontal contour line of the district is shrunk inward by two building level reference modulus units (16.8 meters), to form a horizontal contour line of the public space. If a short side of the horizontal contour line of the public space is greater than 1.5 meters, a part formed by the horizontal contour line of the public space is removed from the three-dimensional space block of the district, to form the public space of the district. If the short side of the horizontal contour line of the public space is less than 1.5 meters, the public space is not to be generated.

In this embodiment, the commercial building column grid modulus (8.4 meters) is used as a building level reference modulus unit to meet an actual column grid requirement for parking three cars in an underground garage of a commercial building. A short side of a horizontal contour line of a current district is 110 m and is greater than two building level reference modulus units (16.8 m), and the horizontal contour line of the district is shrunk inward by 16.8 m, so as to form the horizontal contour line of the public space. A short side of the horizontal contour line of the public space is 76.4 m and is greater than a minimum distance of 1.5 meters for human activities. Therefore, the part formed by the horizontal contour line of the public space is removed from a three-dimensional space block of the district, to form the public space of the district.

Figure 7:
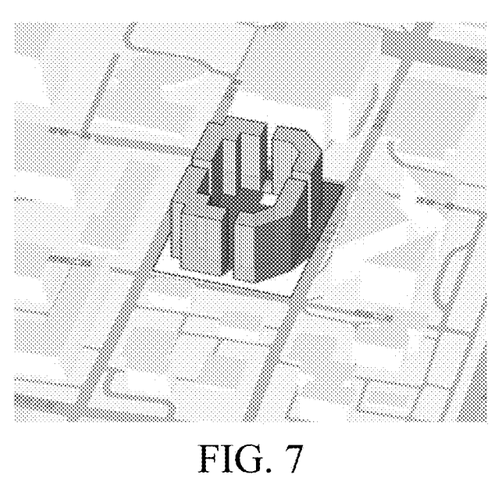
FIG. 7 is a schematic flowchart showing generation of entrances and exits for pedestrians of a district of a building block in a commercial district according to the present invention.

S34: Generate the entrances and the exits of the district for pedestrians.

An entrance-exit spacing index in step 22 is recognized, and entrances and exits having a width of 4 meters for pedestrians are set at an interval of the spacing index, to form a horizontal contour line of the entrances and the exits. A three-dimensional space block of the district of the public space is generated in step 33 to cut the contour line of the entrance and the exit, to form the entrances and the exits for pedestrians and a building block.

In this embodiment, the entrance-exit spacing index in step 22 is 80 meters, and a side length of a two-dimensional plane of a current plot district is between 80 meters and 160 meters, and entrances and exits having a width of 4 meters are set at a middle point of each side, so as to form a horizontal contour line of the entrance and exit. A three-dimensional space block of the district of the public space is generated in step 33 to cut the contour line of the entrance and the exit, to form the entrances and the exits for pedestrians and a building block.

Figure 8:
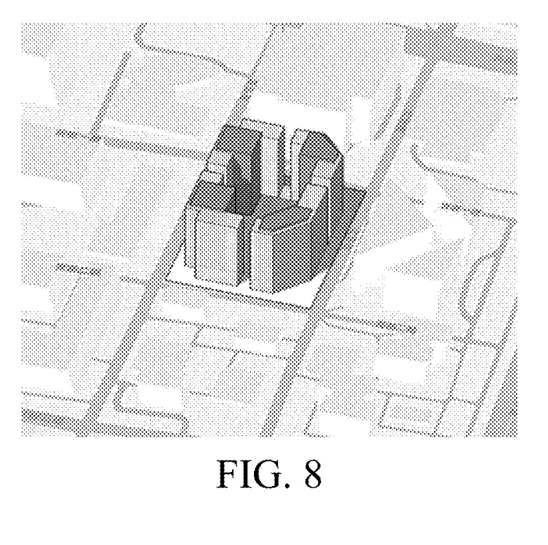
FIG. 8 is a schematic flowchart showing generation of a tower building and a podium building of a district of a building block in a commercial district according to the present invention.

S35: Generate the tower building and the podium building of the district.

A height of the three-dimensional space block of the district generated in step S32 is determined. According to a requirement for a minimum quantity of storeys of the tower and an average height of each storey of the tower, if the height is less than 48 meters, the tower building is not to be generated. The tower buildings are all multi-storey podium buildings. If the height is greater than or equal to 48 meters, the three-dimensional space block is expanded toward two sides by 30-40 meters from a vertex of the horizontal contour line of the district in step 31, to form a planar contour line of towers, a high-rise building setback line index in step 22 is recognized, and the planar contour line of the towers is shrunk inward by a corresponding distance. Further, a quantity of to-be-generated towers is determined, and according to a minimum fire protection spacing and a tower width, if the long side of the horizontal contour line of the district is less than 53 meters, 1 tower is generated. If the long side of the horizontal contour line of the district is greater than 73 meters and the short side is less than 53 meters, 2 towers are generated. If both sides of the horizontal contour line of the district are greater than 73 meters, 4 towers are generated. Further, a generated planar contour line of the towers is screened to remove planar contour lines of towers having two sides that do not face roads.

48 meters are a minimum quantity 12 of floors of the tower multiplied by an average height 4 meters of each floor of the tower.

In this embodiment, the height of a three-dimensional space block of the district generated in step S32 is 150 meters. Since the height is higher than a height limit of a podium of a conventional building of 50 meters, a tower should be generated. The tower building is expanded toward two sides by 30 meters from a vertex of the horizontal contour line of the district, to form a planar contour line of the towers. The setback line index of 10 meters of the podium in step 22 is recognized, and a high-rise building setback line index of 15 meters is recognized. The planar contour line of the towers is shrunk inward by 5 meters as a difference between the two indexes. Further, the fire protection spacing of 13 meters of the commercial building in step 22 is extracted. If the two towers are on the same side, the side length of the side should be greater than 73 meters (a sum of the minimum fire protection distance and the width of the two towers). In this embodiment, the two sides of the horizontal contour line of the district are both greater than 73 meters, so that 4 towers are to be generated. It is determined that the planar contour lines of the 4 towers have two sides facing the roads, and therefore are not to be removed.

Figure 9:
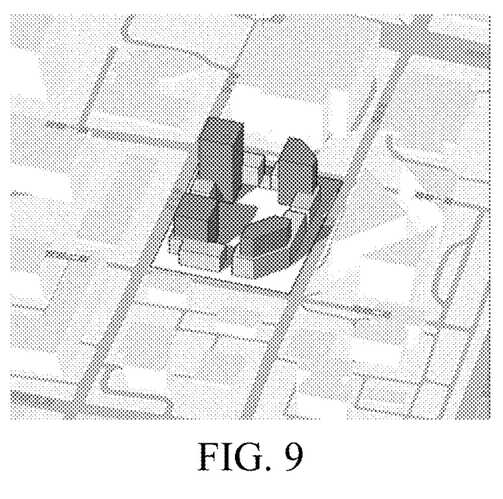
FIG. 9 is a schematic diagram showing generation of building heights and optimization of a podium building form of a district of a building block in a commercial district according to the present invention.

S4: Generate three-dimensional building heights of the district and optimize building forms based on machine learning.

A training sample library of three-dimensional contour lines of the district is constructed, a machine learning model is loaded to generate three-dimensional building heights of the district, and building forms of the podium are optimized to generate a plurality of schemes for the building block of the district.

S41: Construct the training sample library of the three-dimensional contour lines of the district.

Remote-sensing images of districts and images of street view of different cities are collected by using a built-in data collection module. The remote-sensing images and the images of the street view are adjusted to a same proportional scale of 1:2000 and to a same dimension of 1920*1080, to form a sample library of districts and generate form characteristic indexes of the district. Further, the form characteristic indexes of the target district are inputted, a district having a matching degree of more than 90% is selected, and the three-dimensional contour lines of the district is extracted to form the training sample library for the three-dimensional contour line of the district. A quantity of training samples is 10000. The form characteristic indexes of the district include a shape index of the district, an area of the district, a building density, a floor area ratio, and a land use property.

In this embodiment, remote-sensing images of districts and images of street view of different cities are collected by using a built-in data collection module, and are adjusted to a same proportional scale of 1:2000 and to a same dimension of 1920*1080. According to the Code for Compilation of Urban Regulatory Detailed Planning, five indexes of a shape index, an area of the district, a building density, a floor area ratio, and a land use property to be compared are selected as the form characteristic indexes of the sample library. Further, the form characteristic indexes of the district in this example are extracted from the three-dimensional space sand table. The districts having the matching degree of five indexes above 90% are selected, and the three-dimensional contour lines of the district are extracted, to form a training sample library including 10000 examples of the three-dimensional contour lines of the district.

S42. Generate building heights of the district and optimize building forms of a podium.

A CNN model is constructed by using the training sample library for the three-dimensional contour line of the district generated in step S41, to recognize concave-convex characteristics of a three-dimensional contour line of the district in the training sample library, so as to generate the three-dimensional contour line of the target district. Further, a GAN model is constructed to perform adversarial training on the generated three-dimensional contour line of the target district, so that the generated sample gradually approximates the training sample, and a three-dimensional contour line scheme set of the district is outputted, to generate the building heights of the district and optimize the podium building form in step S35. The concave-convex characteristics of the three-dimensional contour line of the district include a location of a protruding point of a vertical surface, a convex-concave degree of the vertical surface, and a convex-concave degree of a horizontal surface. The location of the protruding point of the vertical surface may be used for determining a tower location, the convex-concave degree of the vertical surface may be used for determining the building height, and the convex-concave degree of the horizontal surface may be used for optimizing the building form of the podium.

In this embodiment, the training sample library of the three-dimensional contour line of the district generated in step S41 is used. A computer is used to build a CNN model, and recognize the three-dimensional contour line characteristics of the district in the training sample library (the location of the protruding point of the vertical surface, the convex-concave degree of the vertical surface, and the convex-concave degree of the horizontal surface). A characteristic cluster of the training sample is constructed by using a K-means clustering algorithm. Further, a GAN model is constructed to perform adversarial training on the generated three-dimensional contour line of the target district, so that the generated sample gradually approximates the training sample, and a three-dimensional contour line scheme set is outputted, to generate the building heights of the district and optimize the podium building form in step S35. The location of the protruding point of the vertical surface may be used for determining a tower location, the convex-concave degree of the vertical surface may be used for determining the building height, and the convex-concave degree of the horizontal surface may be used for optimizing the building form of the podium.

S43: Generate the schemes for the building block of the district.

A floor area ratio index of the district in step S22 is recognized, interactive verification is performed with the schemes for the building block of different heights generated in step S36, and height adjustment is performed on a scheme that does not meet the floor area ratio requirement, until the floor area ratio requirement is met.

In this embodiment, the floor area ratio index of 5.2 of the district is recognized in step S22, and the floor area ratio of the generated scheme is calculated by using the floor area ratio calculation formula and is compared with the index. For the scheme that exceeds the index 5.2 of floor area ratio, a genetic algorithm is used to adjust the height, and the iterative generation is continuously performed, until the requirement for the floor area ratio is satisfied. The calculation formula of the floor area ratio R is:

$$R = \frac{H_{tower}/4 * S_{tower} + H_{podium}/5 * S_{podium}}{S_{district}}$$

$H_{tower}$ is a height of a tower building, $S_{tower}$ is a floor area of the tower building, $H_{podium}$ is a height of the podium building, $S_{podium}$ is a floor area of the podium building, and $S_{district}$ is an area of the district.

S5: Perform human-computer interactive display of the schemes and output of the schemes.

Simulated display of the schemes and display of scheme indexes are performed by using a holographic display device, and the schemes are outputted.

S51: Visualize the design schemes for a three-dimensional building block of the district.

The plurality of schemes of the three-dimensional building block of the district generated in step S43 is embedded in a three-dimensional space sand table, and simulated display of the schemes and display of scheme indexes are performed by using a 360° holographic display device.

In this embodiment, a computer server is used to import the multi-scheme for the building block of the district generated in step S43 into a geographic information platform, and a spatial adjustment tool is used to correct the coordinates and elevation of a case model, so that the case model is accurately embedded in the three-dimensional space sand table generated in step S12. The 360° holographic display device having a display area of more than 150 cm*150 cm or more is used to display a three-dimensional model and indexes. Motion instructions are recognized by using a motion recognition module to realize the display operation of moving, zooming, and rotating the content of the sand table.

S52: Output scheme results.

The schemes for the building block of the district in step S43 are printed by using a color printer having a resolution of not less than 4800 dpi to obtain a paper drawing, and the paper drawing is exported to auxiliary design software such as SketchUp and AutoCAD by using a built-in file format conversion module for further design and optimization by planning staff.

The foregoing displays and describes basic principles, main features, and advantages of the present invention. A person skilled in the art may understand that the present invention is not limited in the foregoing embodiments. Descriptions in the embodiments and this specification only illustrate the principles of the present invention. Various modifications and improvements are made in the present invention without departing from the spirit and the scope of the present invention, and such modifications and improvements shall fall within the protection scope of the present invention.

What is claimed is:

1. An artificial intelligence (AI)-based method for generating a building block in a commercial district, the method comprising following steps:
   S1: collection of basic data of a district and construction of a three-dimensional space sand table, comprising:

acquiring geographic information data of a target district and surrounding districts, converting the data to be in a same coordinate system, and constructing a three-dimensional space sand table;

S2: extraction of district design conditions and spatial matching, comprising:

translating and extracting design conditions in various planning files and local legal regulations, performing spatial information matching, and embedding the design conditions in the target district in a form of an attribute table;

S3: generation of a three-dimensional building block of the district based on the design conditions, comprising:

successively generating a two-dimensional plane of the district, a three-dimensional space block of the district, a public space of the district, entrances and exits of the district for pedestrians, a tower building of the district, and a podium building of the district based on the extracted design conditions;

S4: generation of three-dimensional building heights of the district and optimization of building forms based on machine learning, comprising:

constructing a training sample library of three-dimensional contour lines of the district, loading a machine learning model to generate three-dimensional building heights of the district, and optimizing building forms, to generate a plurality of schemes for the building block of the district; and S5: human-computer interactive display of the schemes and output of the schemes, comprising:

performing simulated display of the schemes and display of scheme indexes by using a holographic display device, and outputting the schemes.

2. The AI-based method for generating a building block in a commercial district according to claim 1, wherein step S1 comprises following steps:

S11: collection of geographic information data of the district, comprising:

collecting, by using a surveying and mapping unmanned aerial vehicle (UAV) having more than 20 million pixels, geospatial information of a target district and a district expanding from the target district, converting, by using a built-in data collection module, image information in a grid format to vector data, and inputting the vector data to a geographic information platform; and S12: construction of a three-dimensional space sand table of the district, comprising:

in the geographic information platform, converting the geospatial vector data in step S11 to be in a same coordinate system, performing matching between spatial geographic coordinates and projection coordinates, and constructing a high-precision three-dimensional space sand table.

3. The AI-based method for generating a building block in a commercial district according to claim 2, wherein the geospatial information comprises a district road, a district building, a district public space, and a district terrain.

4. The AI-based method for generating a building block in a commercial district according to claim 1, wherein step S2 comprises following steps:

S21: extraction of the design conditions of the district, comprising:

collecting a regulatory planning text and a relevant legal regulation file related to the target district by using a built-in data collection interface, loading a database component to extract the design conditions of the district, and presetting to-be-extracted content of the design conditions of the district in the component, wherein the to-be-extracted content comprises: a floor area ratio, a building density, a building height restriction, a building setback line, a fire protection spacing of a commercial building, a spacing between an entrance and an exit for pedestrians, and a stopping sight distance of surrounding roads; and S22: standardized processing of the design conditions and spatial matching of the district, comprising:

standardizing the design conditions of the district collected in S21, adjusting data formats to be same, performing spatial matching with the three-dimensional space sand table, and providing a link to the target district in a form of an attribute table.

5. The AI-based method for generating a building block in a commercial district according to claim 4, wherein the building setback line comprises a podium building setback line and a high-rise building setback line.

6. The AI-based method for generating a building block in a commercial district according to claim 4, wherein the relevant legal regulations comprise Code for Design of Store buildings, Code for Fire Protection Design of Buildings, and Code for Planning of Intersections on Urban Roads.

7. The AI-based method for generating a building block in a commercial district according to claim 1, wherein step S3 comprises following steps:

S31: generation of the two-dimensional plane of the district, comprising:

recognizing the building setback line index of a podium building and the stopping sight distance index of surrounding roads in the design conditions of the district in step S22, shrinking contour lines of the district inward by a corresponding distance to form a planar contour line of the district, and filling the planar contour line of the district, to form a two-dimensional plane of the district;

S32: generation of the three-dimensional space block of the district, comprising:

recognizing the building height restriction index in the design conditions of the district in step S22, and lifting the two-dimensional plane of the district in step S31 to the building height restriction, to form a three-dimensional space block of the district;

S33: generation of the public space of the district, comprising:

determining a length and a width of a horizontal contour line of the three-dimensional space block in step S32 by using a commercial building column grid modulus as a building level reference modulus unit, and if a long side of the horizontal contour line of the district is less than or equal to two building horizontal reference modulus units, skipping generating the public space; if a short side of the horizontal contour line of the district is greater than two building level reference modulus units, shrinking the horizontal contour line of the district inward by two building level reference modulus units, to form a horizontal contour line of the public space;

if a short side of the horizontal contour line of the public space is greater than 1.5 meters, removing a part formed by the horizontal contour line of the public space from the three-dimensional space block of the district, to form the public space of the district; and if the short side of the horizontal contour line of the public space is less than 1.5 meters, skipping generating the public space;

S34: generation of the entrances and the exits of the district for pedestrians, comprising:

recognizing an entrance-exit spacing index in step 22, setting an entrance and an exit having a width of 4 meters for pedestrians at an interval of the spacing index, to form a horizontal contour line of the entrances and the exits, and generating a three-dimensional space block of the public space in step 33 to cut the contour line of the entrances and the exits, to form the entrances and the exits for pedestrians and building blocks having a same height;

S35: generation of the tower building and the podium building of the district, comprising:

determining a height of the three-dimensional space block of the district generated in step S32, and according to a requirement for a minimum quantity of storeys of a tower and an average height of each storey of the tower, if the height is less than 48 meters, skipping generating the tower building, where the tower buildings are all multi-storey podium buildings; if the height is greater than or equal to 48 meters, expanding the three-dimensional space block toward two sides by 30-40 meters from a vertex of the planar contour line of the district in step 31, to form a planar contour line of the towers, recognizing the high-rise building setback line index in step 22, and shrinking the planar contour line of the towers inward by a corresponding distance;

determining a quantity of to-be-generated towers, and according to a minimum fire protection spacing and a tower width, if the long side of the horizontal contour line of the district is less than 53 meters, generating 1 tower; if the long side of the horizontal contour line of the district is greater than 73 meters and the short side is less than 53 meters, generating 2 towers; and if both the sides of the contour line of the district are greater than 73 meters, generating 4 towers, and screening planar contour lines of the generated towers to remove planar contour lines of towers having two sides that do not face roads.

8. The AI-based method for generating a building block in a commercial district according to claim 1, wherein step S4 comprises following steps:

S41: construction of the training sample library of the three-dimensional contour lines of the district, comprising:

collecting remote-sensing images of districts and images of street view of different cities by using a built-in data collection module, adjusting the remote-sensing images and the images of the street view to a same proportional scale of 1:2000 and a same dimension of 1920*1080, to form a sample library of the districts and generate form characteristic indexes of the districts, inputting a form characteristic index of the target district, and selecting districts having a matching degree of more than 90% and extracting three-dimensional contour lines of the districts to form the training sample library for the three-dimensional contour lines of the district, wherein a quantity of training samples is 10000;

S42: generation of the building heights and optimization of the building forms of the district, comprising:

constructing a convolutional neural network (CNN) model by using the training sample library for the three-dimensional contour lines of the district generated in step S41, to recognize concave-convex characteristics of the three-dimensional contour lines of the district in the training sample library, to generate the three-dimensional contour lines of the target district, constructing a generative adversarial network (GAN) model to perform adversarial training on the generated three-dimensional contour lines of the target district, so that a generated sample gradually approximates the training sample, and outputting a three-dimensional contour line scheme set of the district, to generate the building heights of the district and optimize the forms of the podium buildings in step S35;

S43: generation of the schemes for the building block of the district, comprising:

recognizing a floor area ratio index of the district in step 22, performing interactive verification on the schemes for the building blocks of different heights generated in step S42, and performing height adjustment on a scheme that does not meet a floor area ratio requirement, until the floor area ratio requirement is met, wherein a calculation formula of a floor area ratio R is:

$$R = \frac{H_{tower}/4 * S_{tower} + H_{podium}/5 * S_{podium}}{S_{district}}$$

wherein $H_{tower}$ is a height of a tower building, $S_{tower}$ is a floor area of the tower building, $H_{podium}$ is a height of a podium building, $S_{podium}$ is a floor area of the podium building, and $S_{district}$ is an area of a district.

9. The AI-based method for generating a building block in a commercial district according to claim 8, wherein the form characteristic indexes of the district comprise a shape index of the district, an area of the district, a building density, a floor area ratio, and a land use property, the concave-convex characteristics of the three-dimensional contour lines of the district comprise a location of a protruding point of vertical surface, a convex-concave degree of the vertical surface, and a convex-concave degree of a horizontal surface, the location of the protruding point of the vertical surface is used for determining a tower location, the convex-concave degree of the vertical surface is used for determining a building height, and the convex-concave degree of the horizontal surface is used for optimizing the podium building form.

10. The AI-based method for generating a building block in a commercial district according to claim 1, wherein step S5 comprises following steps:

S51: visualization of the design schemes for a three-dimensional building block of the district, comprising:

embedding the plurality of schemes for the building block of the district generated in step S43 in the three-dimensional space sand table, and performing simulated display of the schemes and display of the scheme indexes by using a 360° holographic display device; and S52: outputting of the scheme results, comprising:

printing the schemes for the building block of the district in step S43 by using a color printer having a resolution of not less than 4800 dpi to obtain a paper drawing, and exporting the paper drawing to auxiliary design software by using a built-in file format conversion module for further design and optimization by planning staff.

* * * * *